(12) United States Patent
Smith

(10) Patent No.: US 11,663,646 B2
(45) Date of Patent: May 30, 2023

(54) SYSTEM AND A METHOD FOR FACILITATING THE PROVISION OF GOODS

(71) Applicant: Swyft Inc., San Francisco, CA (US)

(72) Inventor: Lincoln Peter Smith, North Sydney (AU)

(73) Assignee: Swyft Inc., San Francisco, CA (US)

( * ) Notice: Subject to any disclaimer, the term of this patent is extended or adjusted under 35 U.S.C. 154(b) by 117 days.

(21) Appl. No.: 17/006,704

(22) Filed: Aug. 28, 2020

(65) Prior Publication Data

US 2020/0394597 A1 Dec. 17, 2020

Related U.S. Application Data

(63) Continuation of application No. 15/539,829, filed as application No. PCT/AU2015/050844 on Dec. 24, 2015, now abandoned.

(30) Foreign Application Priority Data

Dec. 24, 2014 (AU) .................. 2014905283
Nov. 22, 2015 (AU) .................. 2015904666

(51) Int. Cl.
*G06Q 30/06* (2012.01)
*G06Q 30/0601* (2023.01)
(Continued)

(52) U.S. Cl.
CPC ......... *G06Q 30/0633* (2013.01); *G06Q 10/08* (2013.01); *G06Q 20/12* (2013.01);
(Continued)

(58) Field of Classification Search
CPC ... G06Q 20/12; G06Q 20/40145; G06Q 10/08
(Continued)

(56) References Cited

U.S. PATENT DOCUMENTS 4,767,917 A * 8/1988 Ushikubo ............ G06Q 20/342
340/5.9
6,394,341 B1 5/2002 Makipaa
(Continued)

FOREIGN PATENT DOCUMENTS

| CN | 102208074 | 10/2011 | |
|---|---|---|---|
| CN | 103116842 | 5/2013 | |
| KR | 20100039865 A | * 4/2010 | ............ G06V 20/66 |

OTHER PUBLICATIONS

Allegra, Antonia, "Get ready for future shock in the supermarket"; [1,2,3,4,5,6 Edition] of The Tribune [San Diego, Calif] published May 13, 1986: retrieved from Dialog on May 20, 2022.*
(Continued)

*Primary Examiner* — Yogesh C Garg
(74) *Attorney, Agent, or Firm* — Toering Patents PLLC

(57) ABSTRACT

Systems and methods for facilitating the provision of goods using automated stores are provided. The automated stores are distributed across a geographical area and are remotely controlled to create an on-line marketplace. Users of the system can access the marketplace using an interactive portal to purchase items. Buyers can create purchase orders for items stocked in the marketplace and collect the items at one or more automated stores. The items are consigned to the buyers in real time at the automated store.

7 Claims, 11 Drawing Sheets

(51) Int. Cl.
*G06Q 20/12* (2012.01)
*G06Q 10/08* (2023.01)
*G06Q 20/40* (2012.01)
*G06Q 30/0204* (2023.01)

(52) U.S. Cl.
CPC ... *G06Q 20/40145* (2013.01); *G06Q 30/0205* (2013.01); *G06Q 30/0641* (2013.01)

(58) Field of Classification Search
USPC .......................................................... 705/26.1
See application file for complete search history.

(56) References Cited

U.S. PATENT DOCUMENTS

| | | | |
|---|---|---|---|
| 8,781,622 B2 | 7/2014 | Mockus | |
| 9,262,771 B1 * | 2/2016 | Patel | G06Q 30/0237 |
| 9,984,352 B2 * | 5/2018 | Ackerman | G06Q 10/087 |
| 2002/0077901 A1 | 6/2002 | Katz | |
| 2002/0165788 A1 | 11/2002 | Bates | |
| 2007/0011089 A1 * | 1/2007 | DeSchryver | G06Q 20/04 |
| | | | 705/35 |
| 2008/0230596 A1 | 9/2008 | Skor | |
| 2009/0306818 A1 | 12/2009 | Slagley | |
| 2010/0262282 A1 | 10/2010 | Segal | |
| 2012/0317639 A1 * | 12/2012 | Huang | G06F 21/32 |
| | | | 726/19 |
| 2012/0323359 A1 | 12/2012 | Richman | |
| 2018/0005167 A1 | 1/2018 | Smith | |

OTHER PUBLICATIONS

Jack G.A.J. van der Vorst; "Effective Food Supply Chains: Generating, Modelling and Evaluating Supply Chain Scenarios" Global ProQuest Dissertations Publishing. (2000) retrieved from Dialog database on 12122022. (Year: 2000).*

PCT International Search Report and Written Opinion in International Application PCT/AU15/050844, dated Feb. 23, 2016, 25 pages.

PCT Preliminary Report on Patentability in International Application PCT/AU15/050844, dated Apr. 27, 2017, 19 pages.

Chinese 1st Office Action in Application 201580076246.X, dated Apr. 30, 2020, 16 pages.

* cited by examiner

SYSTEM AND A METHOD FOR FACILITATING THE PROVISION OF GOODS

CROSS-REFERENCE TO RELATED APPLICATIONS

This application continuation application and claims priority to U.S. patent application Ser. No. 15/539,829, filed Jun. 26, 2017, entitled "System and a Method for Facilitating the Provision of Goods," which is the U.S. national stage phase of international application No. PCT/AU2015/050844 filed Dec. 24, 2015, and claims priority to Australian patent application Nos. 2014905283 and 2015904666 filed Dec. 24, 2014, and Nov. 12, 2015, respectively, the disclosures of which are hereby incorporated in their entirety by reference.

FIELD OF THE INVENTION

The present invention relates to a system and a method for facilitating the provision of goods using automated stores, and particularly but not exclusively to a system and a method for facilitating the provision of items ordered using an on-line marketplace.

BACKGROUND OF THE INVENTION

Purchasing of goods by e-commerce platforms has become common with the introduction of the internet. Items can be selected and purchase orders can be submitted using a website or a portable device application. A parcel with the ordered items is then sent to the buyer via mail.

These technologies have allowed some businesses to operate entirely on-line without retail outlets.

A known distribution model for on-line shopping is based on a central warehouse and an on-line portal accessible via the net. In most cases buyers pay a delivery fee and the items are shipped from the warehouse to an address chosen by the buyer. The delivery method generally involves a private courier or the public postal service.

In some instances, e-commerce companies have adopted a model involving several warehouses distributed across a geographical area to reduce delivery time and improve efficiency. These warehouses are generally fairly substantial in size.

One of the problems related to the remote purchasing of goods, both via catalogue or e-commerce portal, is the time period which is required between the purchase and the actual delivery of the purchased items by to the buyer. This causes a lack of immediate fulfillment for the buyer that has purchased the items, paid for them in most cases, and has to wait a certain period of time, often multiple days, to receive the items. Even where there are several warehouses distributed across a geographical area, there is still a significant delivery delay.

There is a need in the art for a system which provides buyers with a more immediate fulfillment following the purchase of items and improves delivery time and efficiency.

SUMMARY OF THE INVENTION

In accordance with the first aspect, the present invention provides a system for implementing a distributed automated marketplace comprising:
a plurality of remotely controlled automated stores arranged to store physical items and dispense physical items to buyers, each store comprising a communication interface for communicating over a communication network;
a management server arranged to communicate over the communication network with the plurality of remotely controlled automated stores and with a buyer communication device to provide a buyer with an interactive portal;
a consignment module arranged to associate an item located at an automated store with a buyer;
wherein
the interactive portal is arranged to enable the buyer to create a purchase order for one or more items and forward the purchase order to the consignment module; and
the consignment module is arranged to, in response to receiving a purchase order, process the purchase order, advise the buyer, via the interactive portal, of the availability of the one or more items and associate available items with the buyer, and one or more automated stores for collection of the physical item.

In an embodiment, the plurality of remotely controlled automated stores are distributed across a geographical area and the system further comprises an inventory management module arranged to monitor items stocked in the automated stores via the communication network. This allows implementing a distributed automated marketplace where buyers can purchase items and be immediately gratified by having the items consigned to them in real time at one of the automated stores.

In some embodiments, the consignment module is arranged to:
determine the buyer location using data received over the network from the buyer communication device;
identify a an automated store that stocks an item ordered by the buyer and is closest to the location of the buyer; and
advise the buyer of the location of the identified automated store.

After the identity of the buyer has been verified at the store, the consignment module communicates to the automated store over the communication network to enable dispensing of items associated with the buyer. The consignment module may consign the ordered item to the buyer at the one or more automated stores at time of purchase.

In embodiments, the consignment module is arranged to communicate consignment data to the inventory management module so that the inventory management module can withhold consigned items for a buyer until the consignment items are dispensed to the buyer. The consigned items will not be reserved for the buyer at one or more automated stores.

The system may comprise an identity verification module arranged to verify the identity of the buyer before items are dispensed to the buyer; the identification being based on one or a combination of:
matching of buyer location data received over the network from the buyer communication device to a location of the automated store;
reading buyer's biometrical data;
reading data coded in a hardware device embedded in the buyer communication device;
verifying login credentials provided by the buyer; and
verifying a token generated by the consignment module and provided to the buyer over the network.

In some embodiments, the consignment module is arranged to generate an identification token and transmit the token to the buyer over the communication network to allow for verification of the identity of the buyer at the one or more automated stores. The buyer interactive portal may allow for transmission over the communication network of the token to a third party. In addition, the buyer interactive portal may allow for: selection of a courier; and transfer of the token over the communication network to a courier's communication device, whereby the courier may attend at the automated store to retrieve the item on behalf of the buyer.

In embodiments, the system may comprise a buyer management module arranged to categorise buyers based on buyer's purchase transactions and issue discounts or promotions to buyers. The buyer management module may also issue specific discounts or promotions to buyers categorised in a specific category.

In some embodiments, the system may further comprise a market analytics module arranged to scan networks for prices of items offered by third party providers. The market analytics module may provide a price comparison or a price matching option to the buyer for one or more items while the buyer creates a purchase order using the interactive portal.

In some embodiments, the interactive portal is arranged to enable a buyer to create a gift purchase order for consignment to a third party and the consignment module is arranged to associate items in the gift purchase order with the third party at one or more of the distributed automated stores.

In embodiments, the remotely controlled automated stores comprise:
   a housing for storing items;
   a processor, memory, and network communication interface for communicating with the management server;
   a buyer interactive interface for interacting with the buyer that is arranged to provide the buyer with the buyer interactive portal, or to enable browsing of items stocked in the automated store and create purchase orders for items stocked in the automated store.

In some embodiments, the automated stores comprise a buyer identification system for verifying the identity of the buyer before dispensing items associated with the buyer to the buyer. The buyer identification system may comprises one or a combination of:
   an arrangement for determining the proximity of the buyer using a buyer's portable communication device;
   a reader for reading buyer's biometrical data;
   a reader for reading data coded in a hardware device embedded in a buyer's portable communication device; and
   an interface for enabling the buyer to provide login credentials or a token generated by the consignment module.

In accordance with the second aspect, the present invention provides a remotely controlled automated store comprising:
   a housing for storing items;
   a distribution mechanism configured to release selected items for collection by buyers;
   a processor, memory, and network communication interface for communicating with a system in accordance with the first aspect;
   a buyer interactive interface for interacting with a buyer;
   wherein the buyer interface is arranged to allow the buyer to:
   browse items stocked in the automated store and create purchase orders for items available in the automated store and collect the ordered items at the automated store; or
   by communicating via the communication interface with an inventory management module, browse items stocked in a distributed automated marketplace comprising a plurality of remotely controlled automated stores distributed over a geographical area.

In embodiments, the store further comprises a buyer identification system for verifying an identity of the buyer before dispensing items associated with the buyer to the buyer. The buyer identification system may comprises one or a combination of:
   an arrangement for determining the proximity of the buyer using a buyer's portable communication device;
   a reader for reading buyer's biometrical data;
   a reader for reading data coded in a hardware device embedded in a buyer's portable communication device; and
   an interface for enabling the buyer to provide login credentials or a token.

In accordance with the third aspect, the present invention provides a system for facilitating the provision of goods, comprising an ordering system, a communication device and a network of remotely controlled automated stores;
   the ordering system being arranged to receive an order for an item from a buyer device, and to associate the order with a buyer identifier;
   the ordering system further comprising a security module arranged to validate the buyer identifier, the security module, on validation of the buyer identifier, enabling provision of the associated item at a remotely controlled automated store.

In accordance with the fourth aspect, the present invention provides a method for retrofitting a vending machine comprising the steps of:
   connecting a vending machine controller to a communication module arranged to communicate with a management server of an automated marketplace over a network;
   connecting the vending machine controller and the communication module to an interactive module arranged to provide a buyer interactive interface for interacting with a buyer;
   wherein the buyer interface allows the buyer to:
   browse items stocked in the automated marketplace, create purchase orders for one or more of the items and collect the ordered items at one or more automated stores of the marketplace; or
   browse and purchase items stocked in the vending machine.

In embodiments, wherein the method further comprises the step of fitting the vending machine with a buyer identification system for verifying the identity of the buyer before dispensing items associated with the buyer to the buyer.

Advantageously, the method of the fourth aspect allows modifying an existing vending machine by connecting the vending machine controller to a communication module arranged to communicate with an automated marketplace. The modified vending machine enters the network of remotely controlled automated store of the marketplace.

The retrofitted vending machine can be equipped with an interactive module which allows the buyer to access the automated marketplace.

Traditionally, vending machines are remotely located stores that are only accessible to users in the direct vicinity of the machine. Sales at these stores are only driven by impulse and are not researched or well thought-out by buyers. Vending machines retrofitted in accordance with the fourth aspect become remotely controlled automated stores and part of system as defined in the first aspect.

In accordance with the fifth aspect, the present invention provides a mobile communication device program, comprising instructions for controlling a mobile communication device to communicate and interact with a remotely controlled automated store in accordance with the third aspect.

In accordance with the sixth aspect, the present invention provides a mobile communication device program, comprising instructions for controlling a mobile communication device to communicate and interact with a system in accordance with the first aspect.

In accordance with the seventh aspect, the present invention provides a computer program, comprising instructions for controlling a computer to implement buyer interactive portal as defined in the first aspect.

In accordance with the eighth aspect, the present invention provides a computer readable medium, providing a computer program in accordance with the seventh aspect.

In accordance with the ninth aspect, the present invention provides a data signal, comprising a computer program in accordance with the seventh aspect.

In accordance with the tenth aspect, the present invention provides a device for retrofitting a vending machine comprising:
   a communication module arranged to communicate with a management server of an automated marketplace;
   an interactive module arranged to provide a buyer interactive interface for interacting with a buyer; and
   a vending machine communication interface arranged to communicate with a vending machine controller;
   wherein when the device is fitted to the vending machine, the buyer interface allows the buyer to:
   browse items stocked in the automated marketplace, create purchase orders for one or more of the items and collect the ordered items at one or more automated stores of the marketplace; or
   browse and purchase items stocked in the vending machine.

In accordance with the eleventh aspect, the present invention provides a method for retrofitting a vending machine comprising the steps of connecting a device in accordance with the tenth aspect to a vending machine to interface the vending machine to a system in accordance with the first aspect.

In accordance with the twelfth aspect, the present invention provides a method for facilitating the provision of goods across a plurality of remotely controlled automated stores, the method comprising the steps of:
   a management server receiving an order for an item from a buyer over a communication network;
   an inventory management module determining which of a plurality of remotely controlled automated stores stock the item; and
   a consignment module advising the buyer, over the network, of a selected automated store that stocks the item.

In embodiments, the method further comprises the step of the management module communicating over the network with a buyer communication device, to provide the buyer with a buyer interactive portal arranged to enable the buyer to create a purchase order for one or more items and forward the purchase order to the consignment module.

In embodiments, the method further comprises one or more of the following steps performed by the consignment module:
   determining the buyer location using data received over the network from the buyer communication device;
   identifying an automated store that stocks an item ordered by the buyer and is closest to the location of the buyer; and
   advising the buyer of the location of the identified automated store.

In embodiments, the consignment module enables dispensing of items associated with the buyer at the one or more automated stores after an identity of the buyer has been verified at the one or more automated stores.

In some embodiments, the method further comprises the step of an identity verification module verifying the identity of the buyer before items are dispensed to the buyer.

The step of verifying the identity of the buyer may comprise one or more of the following steps:
   matching of buyer location data received over the network from the buyer communication device to a location of the automated store;
   reading a buyer's biometrical data;
   reading data coded in a hardware device embedded in the buyer communication device;
   verifying login credentials provided by the buyer;
   verify a token generated by the consignment module and provided to the buyer over the network.

In some embodiments, the method further comprises the step of the consignment module generating an identification token and transmitting the token to the buyer over the communication network to allow for verification of the identity of the buyer at one or more automated stores.

The buyer may transmit the token to a third party. For example the buyer may select a courier and transfer the token to a courier's communication device and the courier may attend at the automated store to retrieve the item on behalf of the buyer.

In some embodiments the method further comprises the step of a buyer management module categorising buyers based on buyer's purchase transactions and issuing discounts or promotions to buyers.

In some embodiments the method further comprises the step of a market analytics module providing a price comparison or a price matching option to the buyer for one or more items while the buyer creates a purchase order using the interactive portal.

In some embodiments the method further comprises the steps of:
   a buyer creating a gift purchase order for consignment to a third party; and
   the consignment module associating items in the gift purchase order with the third party at one or more of the distributed automated stores.

In accordance with the thirteenth aspect, the present invention provides a computer program, comprising instructions for controlling one or more servers communicating over a network and plurality of remotely controlled automated stores to implement a method in accordance with the twelfth aspect.

In accordance with the fourteenth aspect, the present invention provides a computer readable medium, providing a computer program in accordance with the thirteenth aspect.

In accordance with the fifteenth aspect, the present invention provides a data signal, comprising a computer program in accordance with the thirteenth aspect.

Advantageous embodiments of the present invention provide a system for implementing a distributed automated marketplace comprising a distributed network of automated stores. Each automated store stores several items creating a close inventory of items across the marketplace. Buyers can purchase items from the system remotely using a portable communication device, such as a tablet or a smart phone, and the purchased items can be consigned to the buyer at one or more of the automated stores in real time, providing the buyer with immediate gratification and avoiding inconvenient freight delays. The buyer is aware that an item has been consigned to him at the closest station and is available for pickup form the buyer at any time. Given the proximity of the stores to buyers, the stores can be easily reached to retrieve items. The stores are automatically re-stocked in batches improving the overall efficiency of the entire delivery process and reducing the environmental impact of item delivery.

BRIEF DESCRIPTION OF THE DRAWINGS

Features and advantages of the present invention will become apparent from the following description of embodiments thereof, by way of example only, with reference to the accompanying drawings in which.

DETAILED DESCRIPTION OF SPECIFIC EMBODIMENTS

Embodiments are directed to a system and a method for facilitating the provision of goods using automated stores. The automated stores are distributed across a geographical area and are remotely controlled to create an on-line marketplace. Users of the system can access the marketplace using an interactive portal to purchase items. Buyers can create purchase orders for items stocked in the marketplace and collect the items at one or more automated stores. The items are consigned to the buyers in real time at the automated store.

Embodiments are also directed to remotely controlled automated stores connected to the system. The stores have the capability of identifying a buyer and release items associated to the buyer via a purchase order to the buyer.

Whist compiling a purchase order, the buyer is prompted with stock availability at a plurality of nearby stores.

Items are associated and reserved for the buyer at the store at time of purchase providing immediate gratification. In addition, the system provides the buyer with the option of selecting a courier to pick-up the items and deliver them to a location or an address selected by the buyer.

Embodiments are also related to a method for retrofitting existing vending machines. A communication module can be connected to the vending machine controller allowing to convert vending machines managed by a seller/brand as remotely controlled retail stores connected to the automated marketplace. The retrofitted vending machine can be also equipped with an interactive module which allows the buyer to access the automated marketplace.

Figure 1:
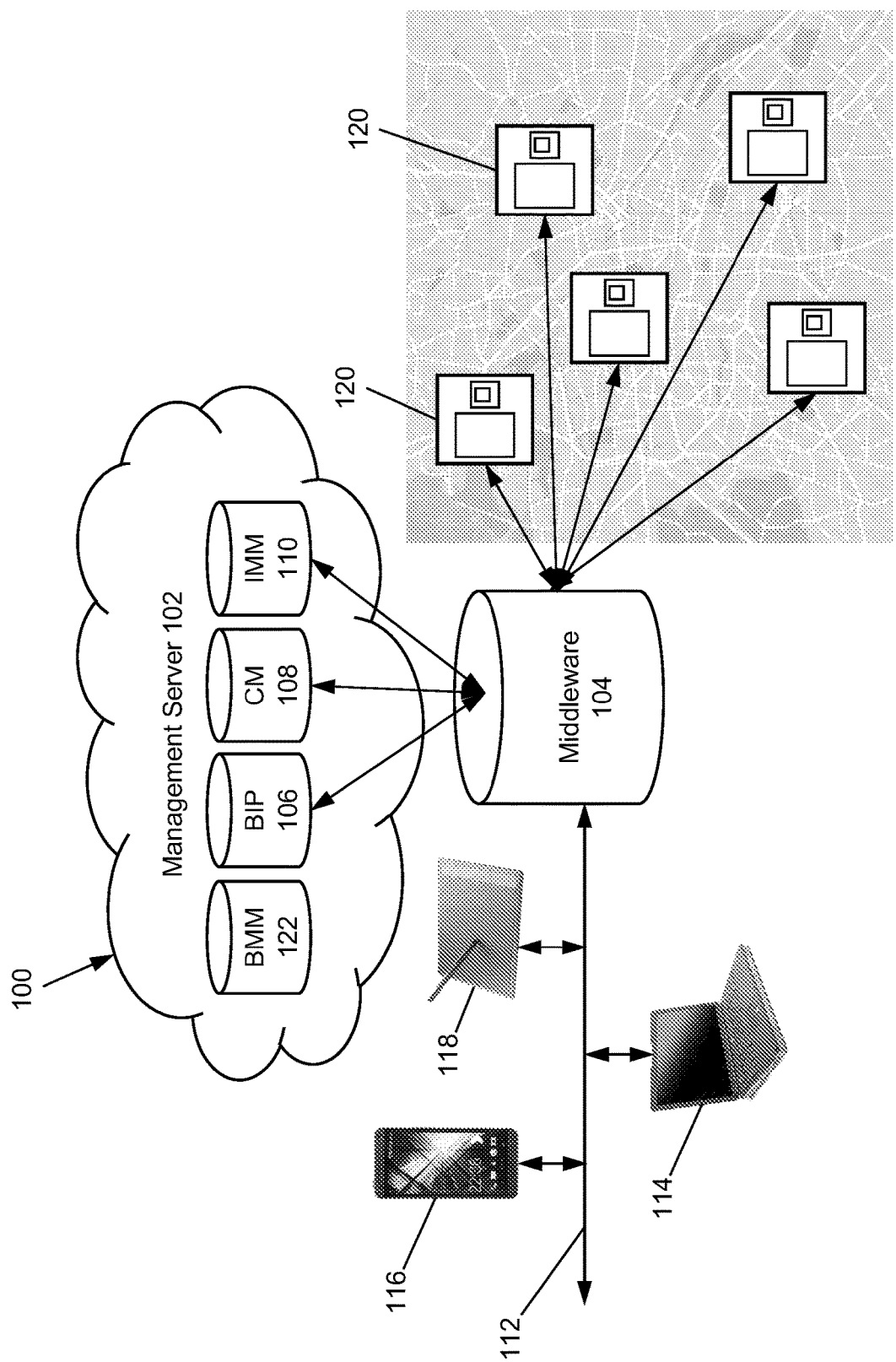
FIG. 1, is a schematic representation of a system in accordance with embodiments.

Referring now to FIG. 1, there is shown a schematic representation of a system 100 in accordance with embodiments. The system can be implemented using a cloud computing architecture where different modules of the system can be managed by a management server 104 and interconnected by middleware 104.

The system 100 implements a number of abstract functions, management of the buyer interactive portal 106, a consignment module 108 and an inventory management module 110.

Buyers can create purchase orders via the interactive portal. The interactive portal can be accessed via a network 112, such as the internet, using, for example, a web browser of a computer 114, a smartphone 116 or a tablet 118. Items are stocked in a plurality of remotely controlled automated stores 120. Location and quantity of stock for each item is managed by inventory management module 110. Buyers can check availability and location of specific items in real time via the interactive portal. For example, buyers can use a specific app on their smartphone with location services and search for a specific item located within a certain distance from the buyers' location.

Payment for a purchase order can also be completed using the interactive portal and are managed by a payment gateway module. After a purchase order is completed, consignment module 108 associates available items to the buyer at one or more of the distributed automated stores. After consignment the items can be collected by the buyer once the buyer's identity has been verified at the automated store. The buyer's identity can be verified using different methods, and different stores may be equipped with different hardware to verify the buyer's identity.

A buyer management module 122 allows managing buyers by collecting data related to purchase transactions and issue specific discounts of promotions to specific categories of buyers. Furthermore, a market analytics module can be used to scan the world wide web for third party prices of items offered in the marketplace. Data related third party prices can be used for price matching or to let the buyer know, through the interactive portal, how much is he or she saving by purchasing the items through the automated marketplace.

The buyer interactive portal also provides a gift function, which provides the buyer with the capability of purchasing items as a gift. These items can be consigned to a third party with an identification token which can be used at the automated store for identification and collection. The gift and the token may be sent to the receiver of the gift, for example, via e-mail. The e-mail message will contain the branding name and logo of the automated marketplace owner, providing a means for advertising the marketplace to third parties.

Figure 2:
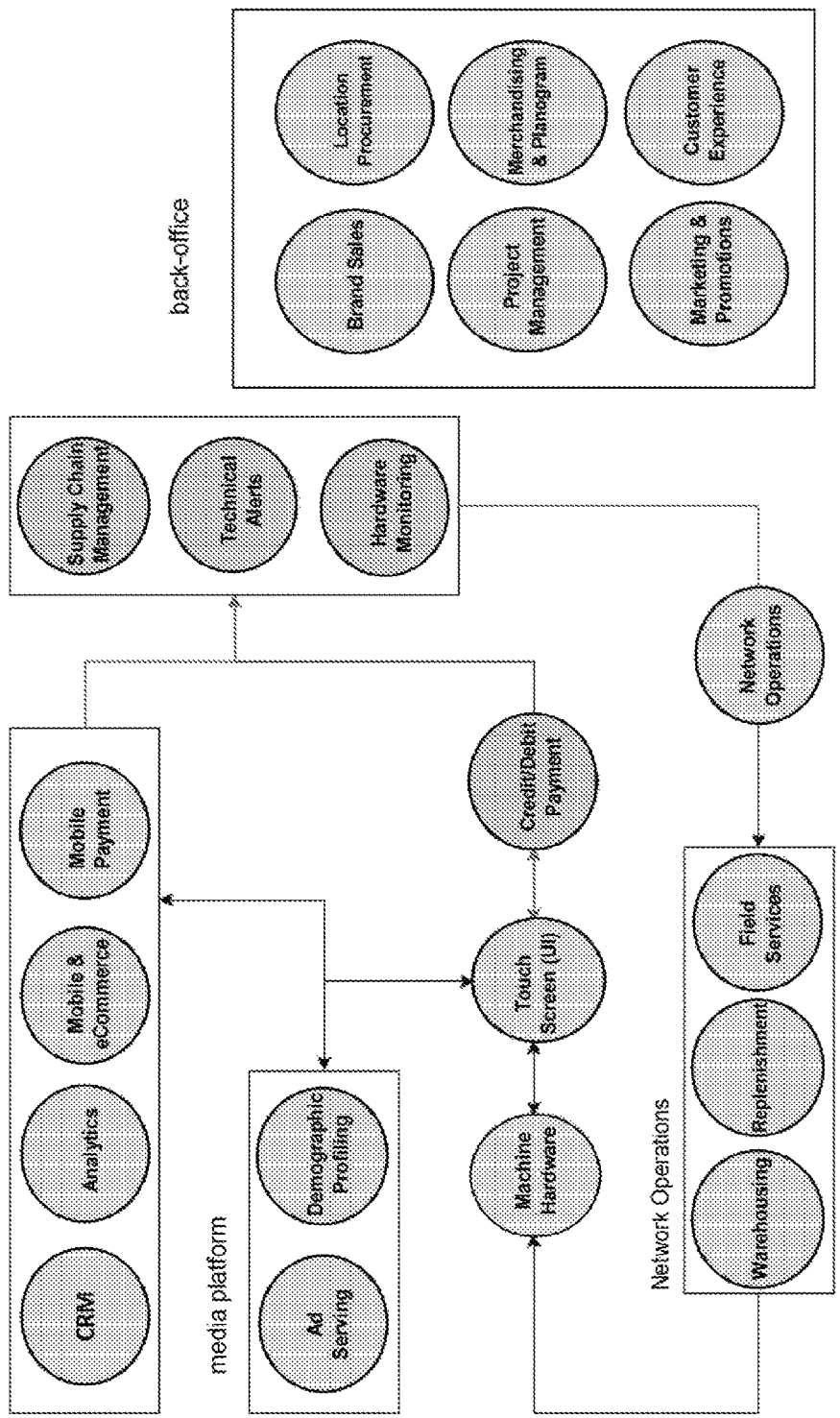
FIG. 2 is a schematic organisational diagram of an automated market place in accordance with embodiments.

Referring now to FIG. 2 there is shown a schematic organisational diagram of an automated market place in accordance with embodiments. Advantages of the automated marketplace, as schematised in FIG. 2, include the possibility of managing stock, payments, buyers and automated stores centrally. These operations have been traditionally performed separately, often by different providers.

The operators of the automated marketplace can link brands and vendors to the buyers by providing a fully integrated system which enables the possibility of designing a number of business methods and marketing strategy, based on buyer's purchasing statistics and payment/revenue statistics. The cloud based platform of the marketplace allows presenting brands and their products for sale with a single interface and in a consistent manner using the interactive portal.

The automated system can be also used to manage and improve warehouse management and streamline re-stocking of the automated stores. Vendors could for example bulk ship products to a single warehouse location where the information system controlling the inventory movements into and out of the warehouse allows receiving orders from a demand forecasting system that is controlling the various sales channels and automated stores being supplied from the warehouse.

The automated marketplace allows vendors to sell high value goods and new hard goods product lines at locations of interest, by selecting the position of the automated stores. Potential customers that walk-by the store can purchase products using the store interactive interface connected to the automated marketplace. At the same time, a much larger number of buyers can be reached using the remote interactive buyer portal.

The marketplace is designed to incorporate one or more vendors/brands and be operated by a single operator. The operator is responsible for contracting the locations. However, the vendors/brands as operating partners have a financial interest in the success of each location. The vendors/brands can contract locations and profit from the retail margin generated by each automated store.

An advantage of the automated marketplace disclosed herein is that it allows a vendor to distribute into a large scale network of automated stores that includes multiple vendors where the brand management, merchandising and channel operations can be centrally managed by a single system and operator.

Figure 3:
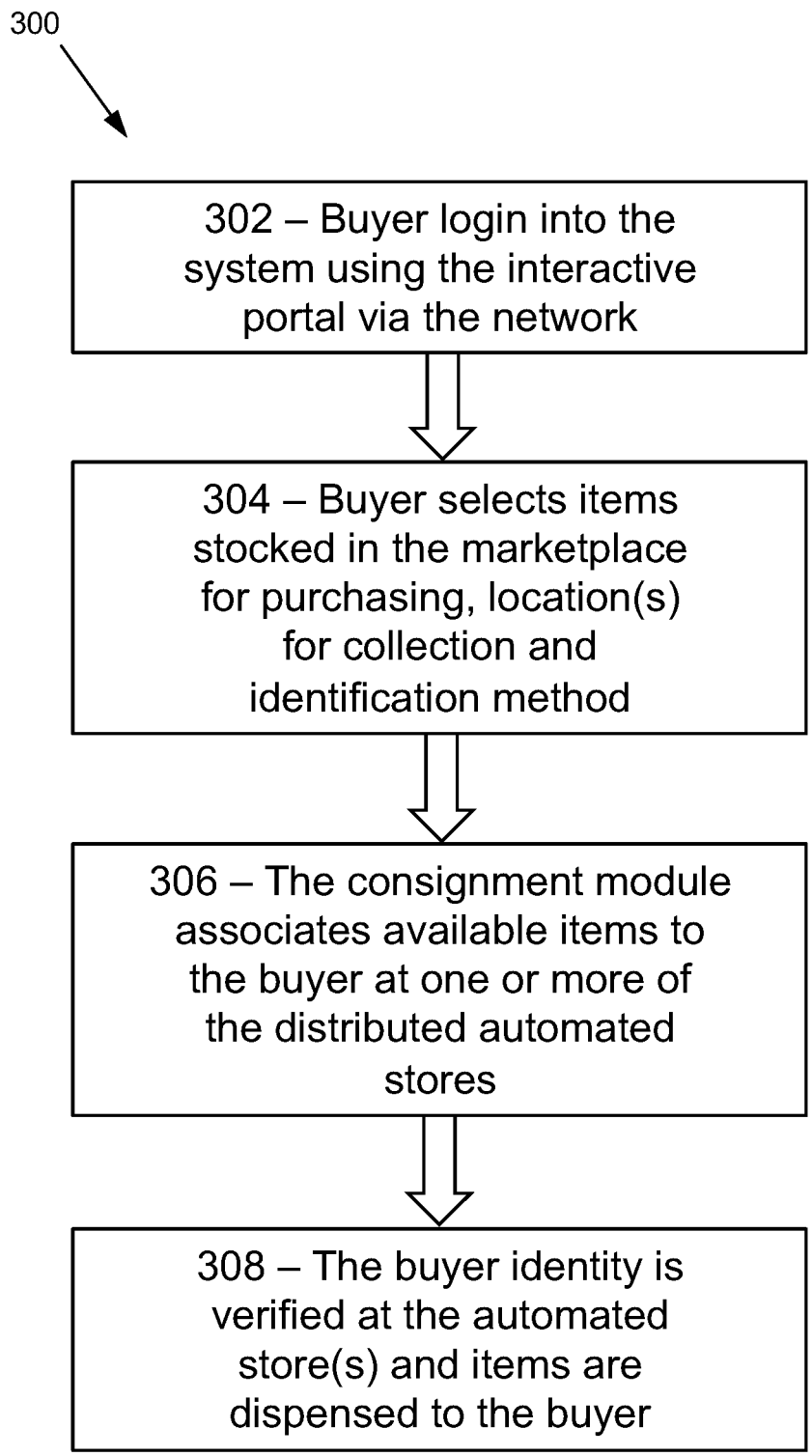
FIG. 3 is a flow diagram of a series of steps performed by a buyer to purchase items using the system of FIG. 1.

Referring now to FIG. 3, there is shown a flow diagram 300 with an example of a series of steps performed by a buyer to purchase items using the automated marketplace. To begin with, a buyer logs in into the system using the interactive portal using a smartphone, tablet or PC, step 302. The buyer is prompted with his/her profile and a catalogue of items stocked in the marketplace. The buyer can select one or more item for purchase, step 304. While the buyer selects the items, the system can provide information about availability in real time by communicating with the inventory management module. If the location of the buyer is available, the system can also provide information on which automated stores stock the specific items and at which location(s) in proximity of the buyer. The buyer can select location(s) for purchase and the identification method to be used at the automated stores, for example, proximity, digital token, biometric identification where available. The buyer can confirm the purchase and process payment via the interactive portal. At step 306 the selected items are associated to the buyer by the consignment module at one or more of the automated stores for collection. At step 308 the buyer identity is verified at the automated store(s) and items are dispensed to the buyer.

The buyer the buyer can decide to pick up the items personally, or delegate a third party to pick up the item and deliver the item to a selected address. This delivery is a local delivery which covers a short distance from the store to the buyer's selected address. The third party can be an authorised courier or any other operator which is registered and works in the area. For example, a taxi driver operating in the local area could be registered and operate deliveries during idle periods of time.

Figure 4:
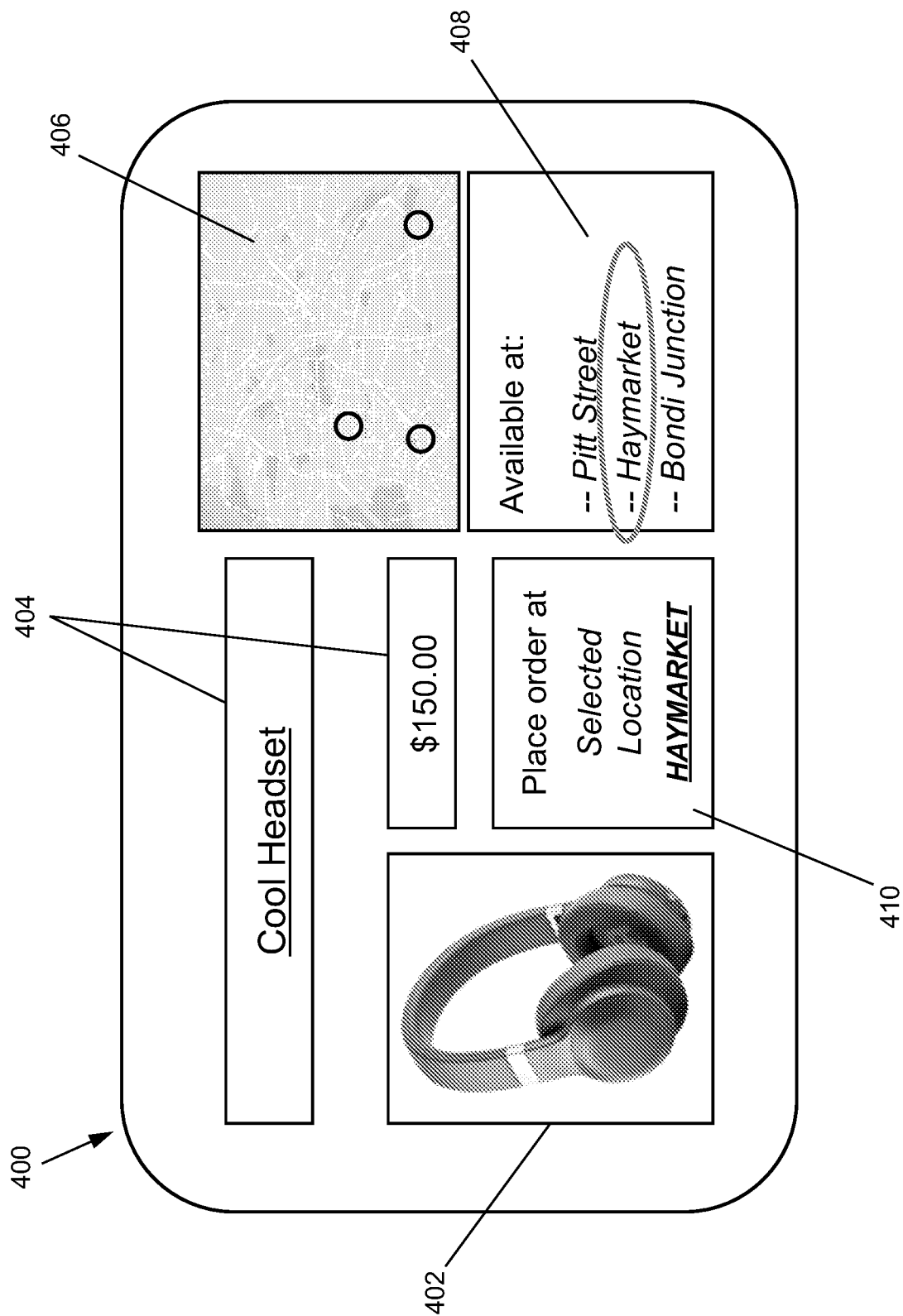
FIGS. 4 and 5 are two schematic representations of possible interfaces provided by the buyer interactive portal.
Figure 5:
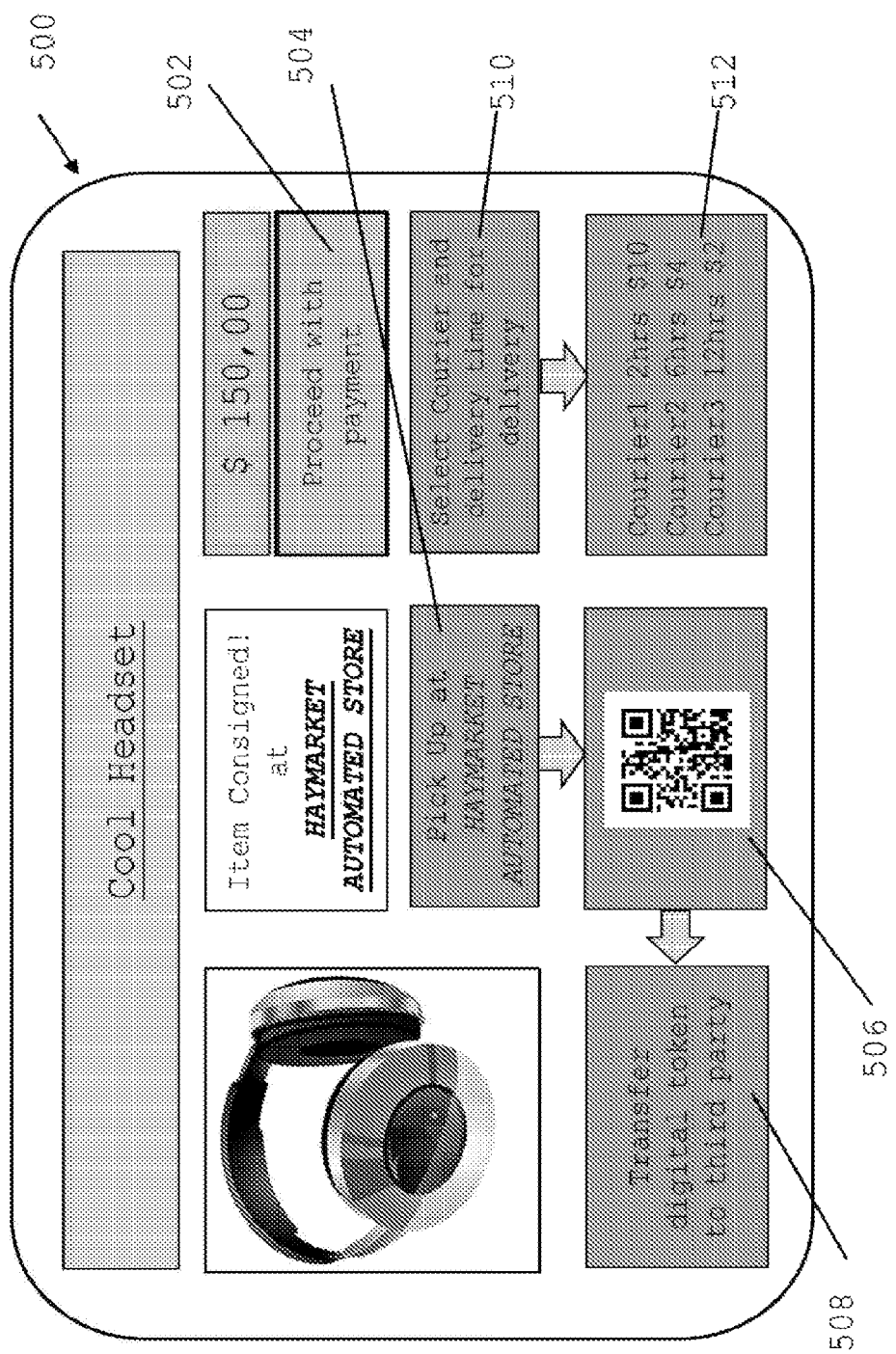

Referring now to FIGS. 4 and 5, there are shown two schematic representations of possible interfaces provided in the buyer interactive portal. The interfaces may be used by the buyer to order an item and finalise consignment using a mobile app running on a smartphone or a tablet, a web portal on a personal computer or using the buyer interactive system of an automated store.

Interface 400 is an interface for ordering items. Interface 400 allows the buyer to browse through inventory and select items, for example headphone 402 to purchase. The inventory management module verifies the real time availability of the items in the system while the buyer is browsing. Interface 400 displays name and price 404 for the item and location 406 of the automated stores where the item is stocked. The list of locations where the item is stocked may be ordered according to different criteria, such as proximity to an address provided by the buyer, or geographical location of the buyer. The buyer can select the preferred store for pick-up using selection menu 408 and place the order the selected location using button 410. In response to the user input indicating the store for pick-up, data records for stock availability for the item, associated with the preferred store selected, are updated by the system to indicate the stock item has been consigned to the user, a consignment order can also be generated. This can involve transmission of the consignment data to the preferred store, for example to enable collection of the item from the store or to ensure that the item is reserved at the store.

Interface 500 provides a series of options to the buyer after the items have been purchased and consigned at the selected automated store. The buyer for example may proceed with payment using button 502. This will direct the buyer to the payment gateway. The buyer can choose to pick the item at the selected store personally 504. In this case a QR code 506 is issued by the system and allows the client to be identified at the selected store.

Alternatively, the buyer can be identified using other means, such as biometric data. A function 508 is also provided to transfer the QR code to a third party for pick-up of the item.

A courier section of the graphical interface allows selecting a courier 512 from amongst a list of couriers available for delivery. As discussed above, the selection of the courier may be based on one or a combination of cost of delivery, priority level, estimated time of delivery, or carbon footprint associated with the delivery.

Figure 6:
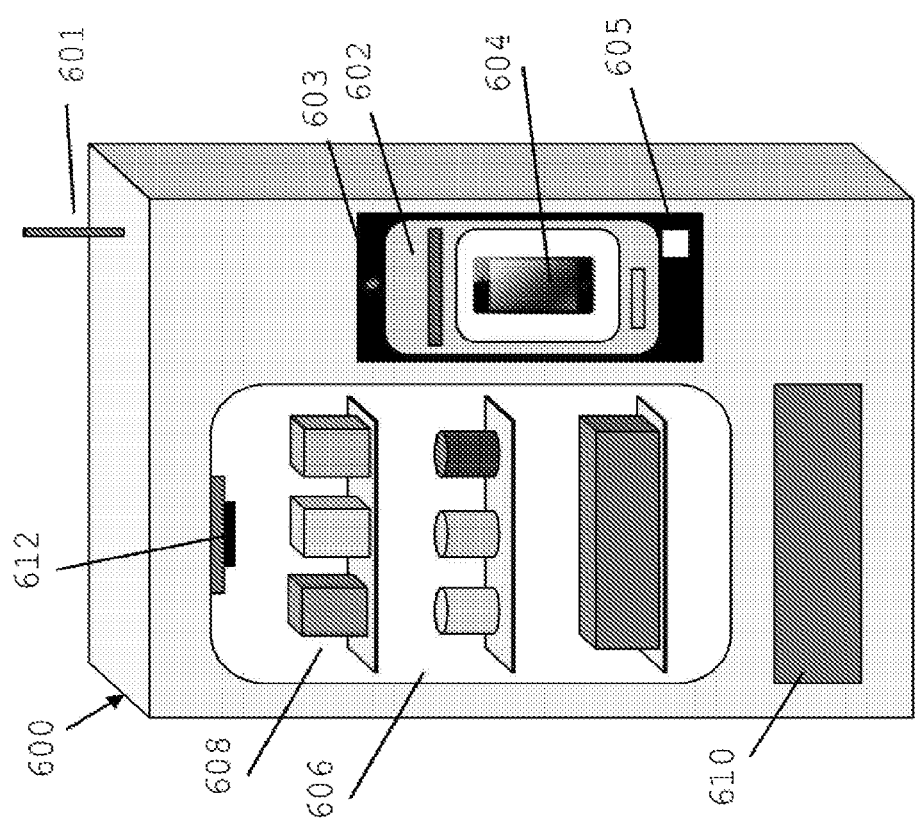
FIG. 6 is a schematic representation of a remotely controlled automated store in accordance with embodiments.

Referring now to FIG. 6, there is shown a schematic representation of a remotely controlled automated store 600 in accordance with embodiments. Store 600 has a housing for storing items 606, a processor, memory, a network communication interface for communicating with the automated marketplace and a buyer interactive interface 604 for interacting with a buyer. The buyer interface 604 allows the buyer to browse items stocked in the automated marketplace, create purchase orders for items available in the automated store 600; and collect the ordered items at the automated store.

In some instances, the buyer interface 604 may also allow the buyer to create purchase orders for the items stocked at different automated stores. In some other instances, the automated store 600 may comprise a buyer interactive system which provides a number of functions and also implements a buyer interactive portal as provided on the buyer's own devices, for example smartphone or tablet.

In embodiments, the remotely controlled automated store also comprises a buyer identification system for verifying the identity of the buyer before dispensing items associated with the buyer to the buyer.

The identity of the buyer can be verified at the store 600 by determining the proximity of a buyer portable communication device that the buyer has used to complete the purchase. A camera 603 provided for biometrical identification and a NFID reader for reading data embedded in the buyer's smartphone is also available. The buyer can also login in the automated market place portal using the interactive interface 604.

Interactive interface 604 can also be used by walk-by customers to purchase items stocked in the store and use the store as a more traditional vending machine. This is an opportunity to exploit the capability of the store and the location and, at the same time, advertise the automated marketplace platform to new customers.

Store 600 comprises a transparent window which shows products 608 stored in the vending machine. Upon release product can be collected through door 410. In alternative embodiments the store 600 is completely sealed and the stored products can exclusively be visualised remotely through system 100 or by using device 602.

Currently there are many providers and brands on the market operating traditional vending hardware and existing vendor operator infrastructure to secure locations and to manage low cost operations. Traditionally, vending machines are remotely located stores that are only accessible to users in the direct vicinity of the machine. Sales at these stores are only driven by impulse and are not researched or well thought-out by buyers.

Embodiments are directed to a method for retrofitting a vending machine to connect the vending machine to the automated marketplace. By retrofitting vending machines, vendors are able to take advantage from the features offered by the distributed automated marketplace without having to go through a substantial investment for brand new hardware. Stock can be kept up to date using financial transaction data and by implementing communication between the vendor inventory management and the inventory management module of the automated marketplace.

Figure 7:
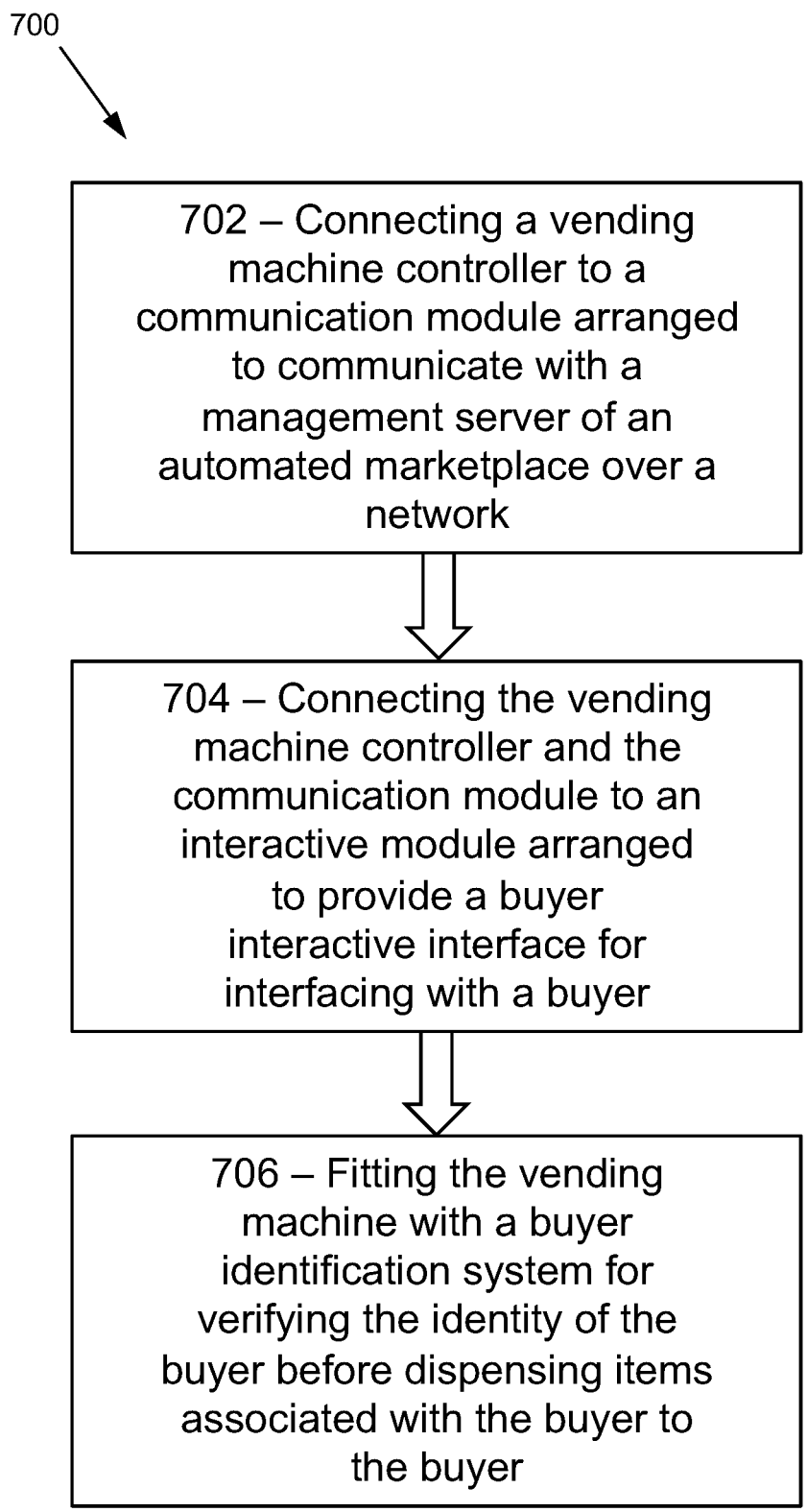
FIG. 7 is a flow diagram outlining the basic steps required to retrofit a vending machine in accordance with embodiments.

Referring now to FIG. 7, there is shown a flow diagram 700 outlining the basic steps required to retrofit a vending machine in accordance with embodiments. At step 702 the controller of the vending machine is connected with a network and a communication module arranged to communicate with a management server of an automated marketplace.

At step 704, the vending machine controller and the communication module are connected to an interactive module arranged to provide a buyer interactive interface for interacting with a buyer. The buyer interface allows the buyer to browse items stocked in the automated marketplace, create purchase orders for one or more of the items and collect the ordered items at the vending machine if available. The interactive module can also be configured to provide the functionalities of marketplace interactive portal as described above. The vending machine may also be fitted with a buyer identification system for verifying the identity of the buyer before dispensing items associated with the buyer to the buyer, step 706.

Figure 8:
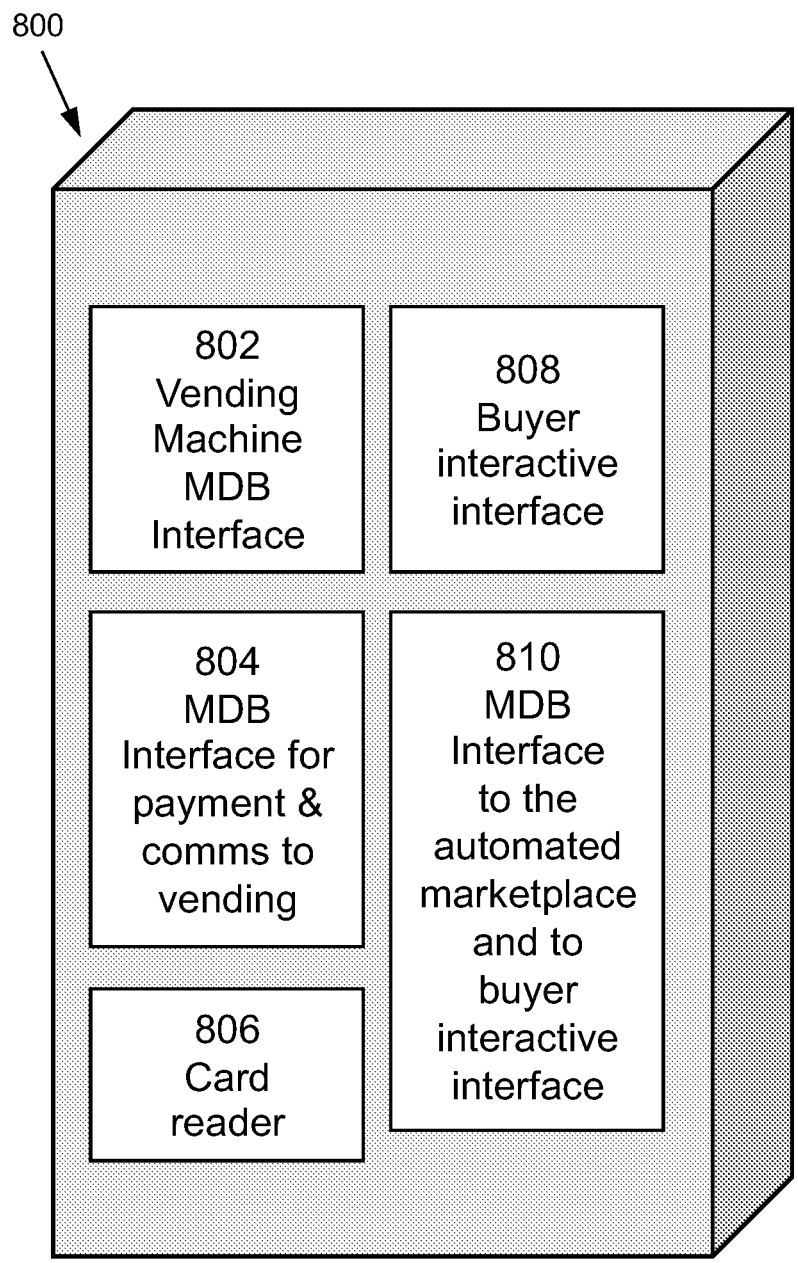
FIG. 8 is a schematic representation of a vending machine retrofitted in accordance with embodiments.

Referring now to FIG. 8, there is shown a schematic representation 800 of a vending machine retrofitted in accordance with embodiments. The vending machine comprises original vending machine modules (802, 804 and 806) and retrofitted modules (808 and 810).

In embodiments of the method, blocks 804 and 806 are removed and their functions are implemented by new blocks 808 and 810, in particular by the buyer interactive interface. The control of the automated store is removed from the original MDB module and moved into blocks 808 and 810. An embodiment of a device 900 used to retrofit a vending machine and replace blocks 808 and 810 of FIG. 8 is shown in FIG. 9.

Figure 9:
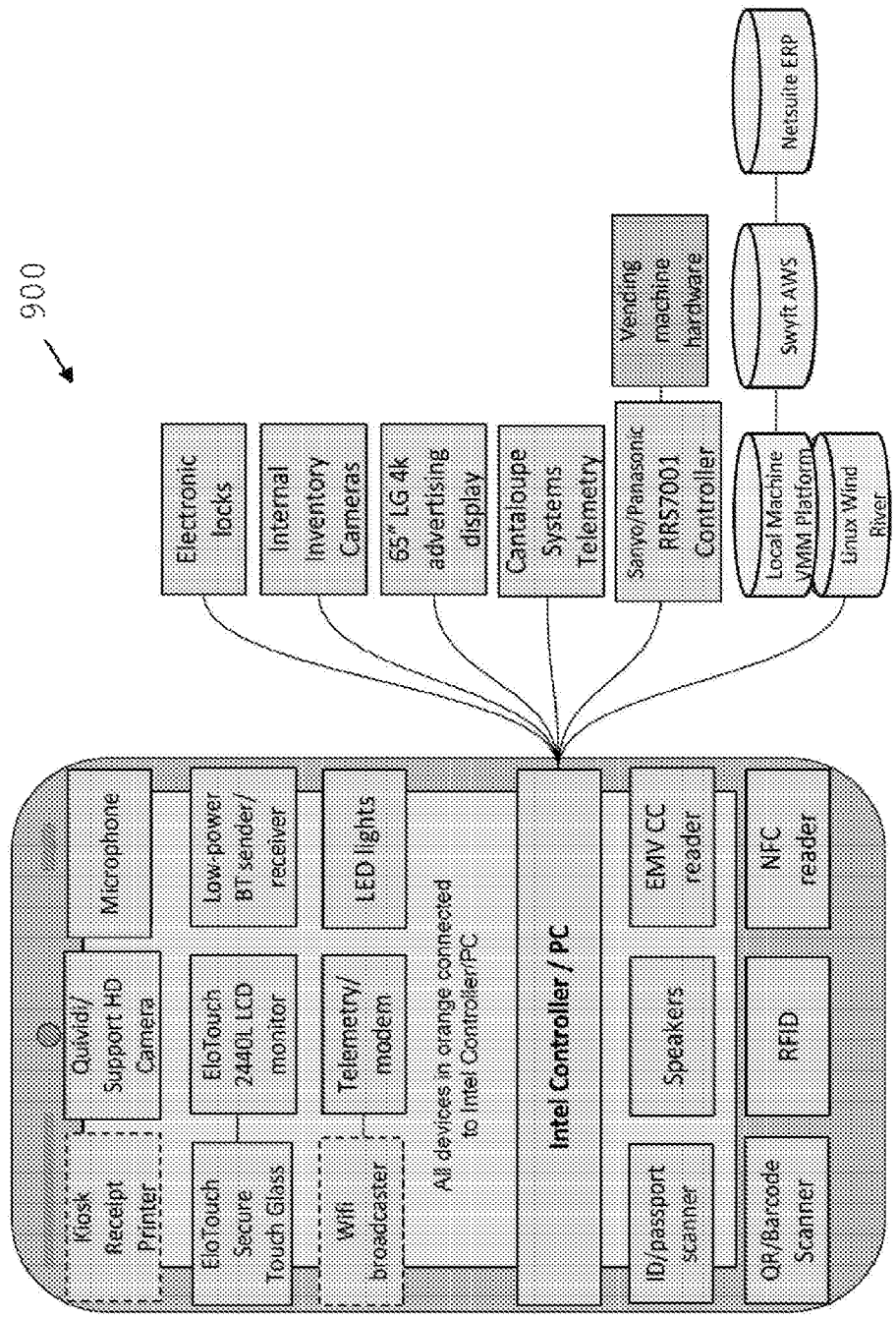
FIG. 9 is a schematic representation of a device used to retrofit a vending machine in accordance with embodiments.

FIG. 9 depicts the buyer interactive console (device 900), this comprises a computing system and auxiliary components that are retrofitted onto an existing vending machine to allow it to connect to the automated marketplace. Device 900 contains a series of hardware components that enable user interaction with the system and the functionality of the software, for example including a processor, memory, network communication interface, scanners/readers, wireless communication interfaces (such as Bluetooth, wifi, IR etc) camera, microphone, speakers, display LED lights etc. For example, a user input interface can be implemented as a touch screen, keypad or buttons or any combination thereof. Other auxiliary devices can include payment devices such as credit card readers, currency receivers, smart card readers, etc. The system may also include a receipt printer. These hardware components are operated by locally hosted software that manages the inputs and outputs of the devices through a series of events. Events can include customer identification, collection authorisation, receiving payment, triggering dispensing of a product etc. For each event rules and process flows are defined which control the system operation of the interactive console and, where applicable, for example to trigger action of the vending machine control system, say to dispense a product. For example, rules and process flows can be defined to authorize dispense of a product (e.g. accept payment or a digital token) and report information via the middleware (104) to the management server (102). The interactive console is configured to establish data communication with the vending machine via the controller (i.e. intel controller). The interactive console controls and exchanges data with the vending machine via simple API calls to the Intel controller, which communicates directly with the vending machine or with the vending machine's existing controller via an API (e.g. RRS7001 [vending machine model] controller), for example to dispense the product. This front-end device that is built into the Intel controller is configured to control any vending machine using Intel's controller (Vending Machine Interface [VMI]) board. While the VMI board is Intel's proprietary hardware, the inclusion of a single front-end interactive user interface that controls the series of events to communicate with this VMI board is a feature introduced in the present invention. The interface to the vending machine or vending machine controller enables triggering of actions already programmed into the vending machine controller (for example processor or PLC), while the higher level functionality of receiving and processing purchase consignment data, reserving products, identifying and authorising customers for collection of products, and processing payments is handled by the interactive console.

Device 900 and its locally hosted software report information to the management server 102. The connection to the management server is established via a telemetry device to the middleware (104), and via a communication network to report information to the management server 102. Typically, events to control a vending machine are handled inside the vending machine controller and this controller can be configured to report information to centralized servers, for example via telemetry and a communication network. Device 900 however is a separate device to the vending machine with processing and memory resources dedicated to the purpose of connecting to the vending machine controller, handling the events and reporting information to the centralized server.

FIG. 9 shows the devices that connect to the local machine server, and through to the middleware server.

Figure 10:
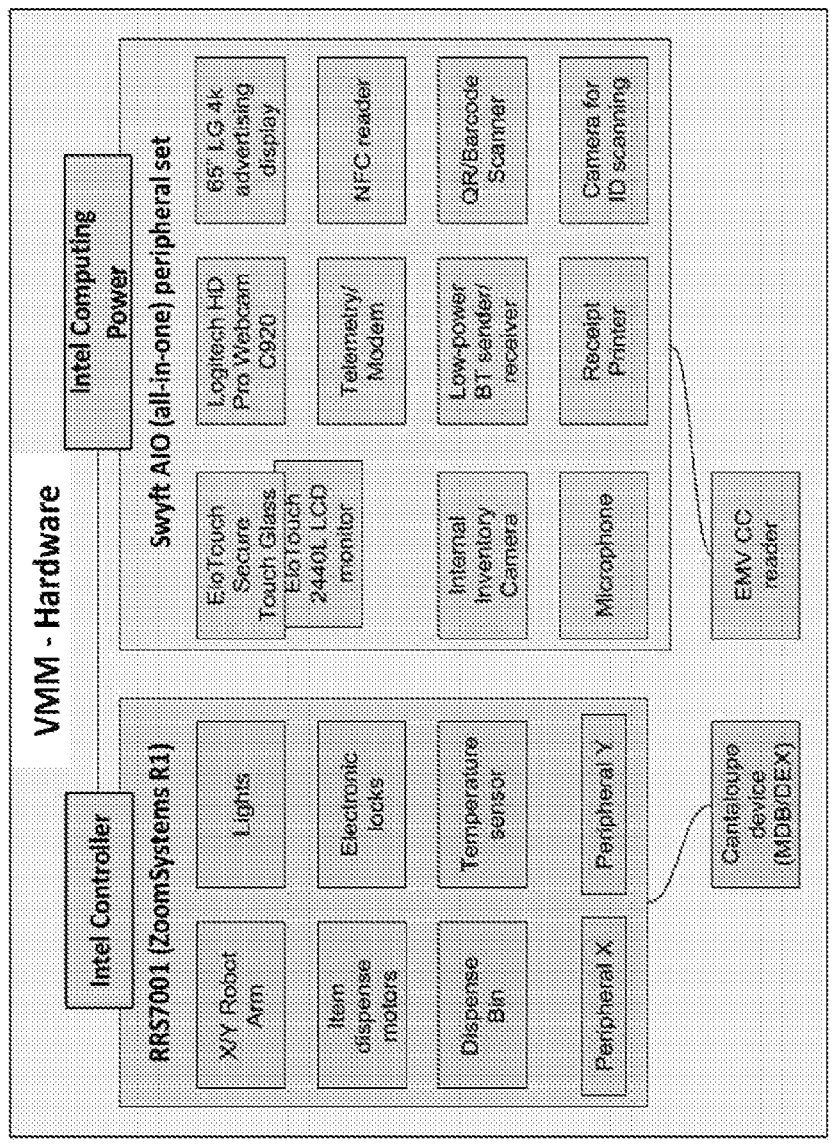
FIG. 10 is a schematic representation of the automated store hardware in accordance with an embodiment.

Referring now to FIG. 10, there is shown a schematic representation of the automated store hardware. This diagram shows the relationship between the Intel Computing Power (standard PC) and the Intel Controller, and the devices that are connected to these. The devices on the right are largely user interactive devices such as a touch screen monitor, whereas devices on the left are related to the functionality of the store and dispensing of goods.

Figure 11:
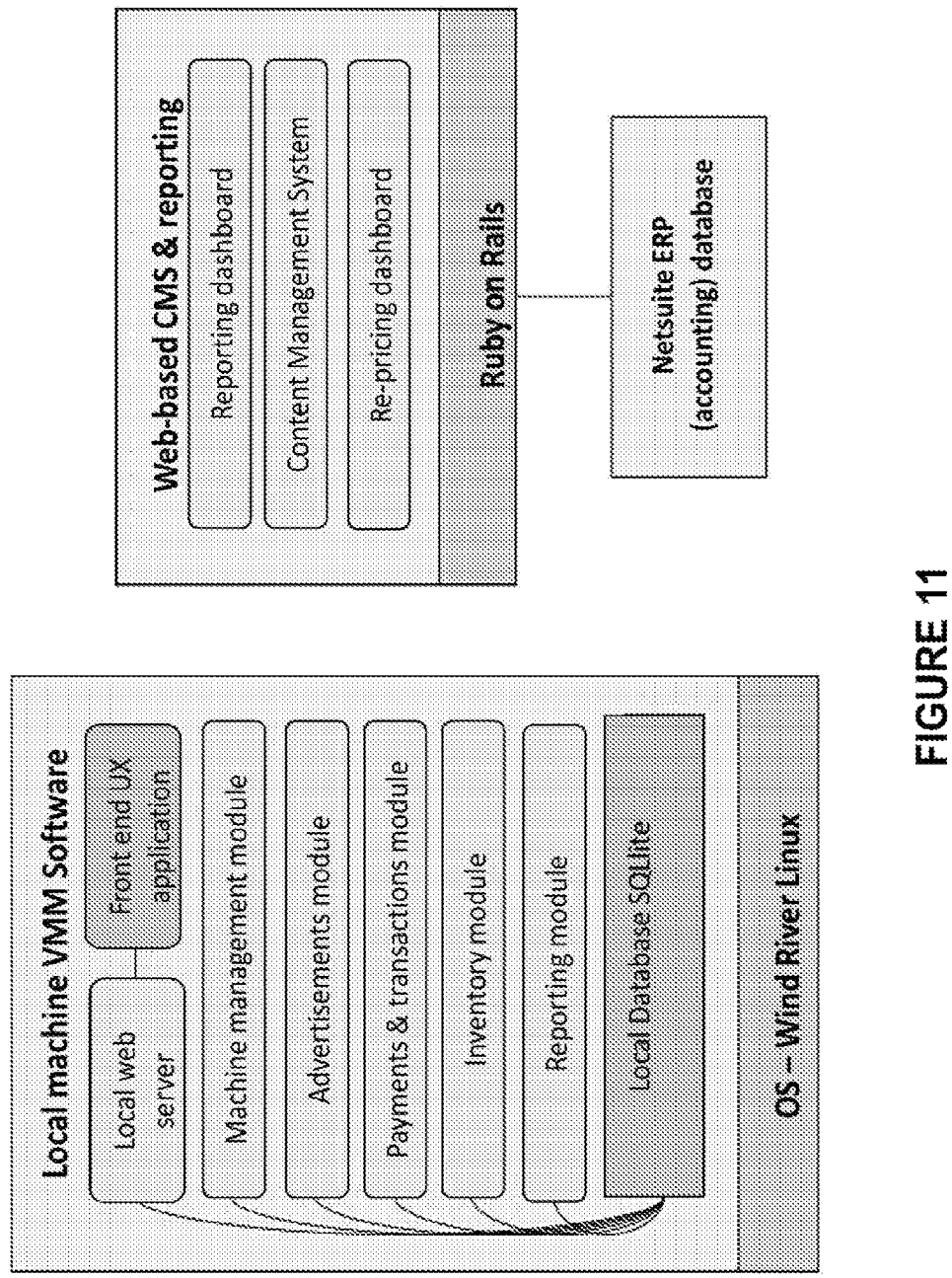
FIG. 11 is a schematic representation of the automated store software modules in accordance with an embodiment.

Referring now to FIG. 11, there is shown a schematic representation of the automated store software. The local machine software comprises a series of modules that handle the events on the local machine. This local machine software is self-sufficient to operate a vending machine (in case of connectivity issues), but reports the information to the management server 102 in real-time and vice-versa. For example as depicted in the bottom right of FIG. 11, using a product as the Netsuite ERP (accounting) database. The management server 102 also communicates with Device 900 to update the software, and to change information on the local database (for example to change the price). This is done via a Content Management System (CMS) depicted on the right hand side of FIG. 11. Information such as a product name, images, description and pictures can be edited in the CMS and the edited information is fed to the management server via an API. The management server 102 then updates the information in the locally hosted vending machine.

The term "comprising" (and its grammatical variations) as used herein are used in the inclusive sense of "having" or "including" and not in the sense of "consisting only of".

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A system, comprising:
a first processor;
a memory coupled to the first processor and storing instructions that, when executed by the first processor, perform operations, comprising:
receiving, over a communication network and from an interactive display provided on a first computing device associated with a first individual, a request for a catalogue of items available for purchase at an automated store, wherein the first computing device is remote from the automated store
determining, based at least in part on the request, a remote location of the first computing device,
identifying a plurality of automated stores associated with the remote location of the first computing device,
receiving, over a communication network, information of a current inventory of items at each of the plurality of automated stores associated with the remote location of the first computing device,
generating a catalogue of items using the current inventory of items at each of the plurality of automated stores associated with the remote location of the first computing device,
sending, over a communication network, the catalogue of items to the first computing device for display on the interactive display of the first computing device,
receiving, over a communication network and from the first computing device, a purchase order request for a selected item in the catalogue of items,
generating an identification token associated with the selected item, the identification token configured to cause the plurality of automated stores to dispense the selected item when the identification token is presented at the plurality of automated stores, and
transmitting the identification token to a second computing device associated with the second individual;
a second processor at each of the plurality of automated stores; and
a memory at and coupled to a corresponding one of the second processors and storing instructions that, when executed by the corresponding second processor, perform operations, comprising:
interfacing with the second computing device to receive the identification token,
validating the identification token, and
in response to a valid identification token, causing the respective one of the plurality of automated stores to dispense the selected item to the second individual.

2. The system of claim 1, wherein the second individual is a courier.

3. The system of claim 1, wherein at least one of the plurality of automated stores is a vending machine.

4. The system of claim 1, further comprising instructions for transmitting the identification token to the first computing device.

5. The system of claim 1, wherein the identification token verifies an identity of either the first individual or the second individual.

6. The system of claim 1, wherein the identification token is transmitted to the second computing device associated with the second individual in response to information provided by the first computing device.

7. The system of claim 1, further comprising instructions for causing the respective one of the plurality of automated stores to dispense the selected item when the second computing device is within a threshold distance from the respective one of the plurality of automated stores.

* * * * *